United States Patent
Kitazoe

(10) Patent No.: US 8,818,395 B2
(45) Date of Patent: Aug. 26, 2014

(54) METHOD AND APPARATUS OF TRACKING AREA ALLOCATION

(75) Inventor: Masato Kitazoe, Hachiouji (JP)

(73) Assignee: QUALCOMM Incorporated, San Diego, CA (US)

(*) Notice: Subject to any disclaimer, the term of this patent is extended or adjusted under 35 U.S.C. 154(b) by 1458 days.

(21) Appl. No.: 12/047,480

(22) Filed: Mar. 13, 2008

(65) Prior Publication Data

US 2008/0254812 A1 Oct. 16, 2008

Related U.S. Application Data

(60) Provisional application No. 60/895,578, filed on Mar. 19, 2007.

(51) Int. Cl.
*H04W 24/00* (2009.01)

(52) U.S. Cl.
USPC .......... 455/456.1; 455/456.2; 455/435.1; 455/456.5; 455/456.6; 455/450; 455/453; 370/331

(58) Field of Classification Search
USPC .......... 455/435.1, 456.1, 456.2, 456.5, 456.6, 455/450, 453; 370/331
See application file for complete search history.

(56) References Cited

U.S. PATENT DOCUMENTS

| | | | |
|---|---|---|---|
| 2001/0050945 A1 | 12/2001 | Lindsey | |
| 2005/0090278 A1* | 4/2005 | Jeong et al. | 455/525 |
| 2006/0084443 A1* | 4/2006 | Yeo et al. | 455/449 |
| 2006/0099960 A1 | 5/2006 | Duan | |
| 2006/0293060 A1 | 12/2006 | Yang et al. | |
| 2007/0184834 A1* | 8/2007 | Jeong et al. | 455/434 |
| 2008/0102896 A1* | 5/2008 | Wang et al. | 455/560 |

OTHER PUBLICATIONS

"Summary of email discussion point 11: Drivers for LTE mobility control", 3GPP TSG RAN WG2 #56bis Tdoc-R2-070368, Jan. 15-19, 2007, Sorrento, Italy.
"Load balancing solutions for LTE", 3GPP TSG RAN WG2 #57 Tdoc-R2-070779 Feb. 12-16, 2007, St. Louis, U.S.A.
"Neighbouring cell information", 3GPP TSG-RAN WG2 Meeting #57 R2-070679 St.Louis, USA, Feb. 12-16, 2007.
"3rd Generation Partnership Project; Technical Specification Group Services and System Aspects; 3GPP System Architecture Evolution: Report on Technical Options and Conclusions (Release 7)", 3GPP TR 23.882 V1.8.0 (Feb. 2007).
International Search Report—PCT/US08/057162, International Search Authority—European Patent Office, Sep. 2, 2008.
Written Opinion—PCT/US08/057162, International Search Authority—European Patent Office, Sep. 2, 2008.
3GPP TSG RAN WG2 #57: "Load balancing solutions for LTE," TDOC-R2-070779, Feb. 12, 2007, pp. 1-5.

(Continued)

*Primary Examiner* — Justin Lee
(74) *Attorney, Agent, or Firm* — Tyler J. Overall

(57) ABSTRACT

Systems and methodologies are described that facilitate camping load balancing utilizing a frequency attribute. In a tracking area update procedure, each tracking area confirmed to user equipment can include an attribute of preferred, non-preferred, or forbidden. Based on such attribute, the user equipment can camp or idle on a particular cell for a specific frequency or network. The user equipment can camp on a cell from a preferred tracking area unless the quality of cells from the preferred frequency or network drops under a minimum threshold. The systems and methodologies provide a unified framework for camping load balancing across different Radio Access Technologies (RATs) and an optimization for the relevant signaling.

64 Claims, 12 Drawing Sheets

(56) References Cited

OTHER PUBLICATIONS

ETSI TS 136 300 V8.0.0 (Mar. 2007) Universal Mobile Telecommunications System (UMTS); Evolved Universal Terrestrial Radio Access (E-UTRA) and Evolved Universal Terrestrial Radio Access (E-UTRAN), Stage 2 (3GPP TS 36.300 version 8.0.0 Release 8).
ETSI TS 125 304 V6,9.0 (Mar. 2006) Universal Mobite Telecommunications System (UMTS); User Equipment (UE) procedures in idle mode and procedures for cell reselection in connected mode (3GPP TS 25.304 version 6.9.0 Release 6).
ETSI TS 145 008 V6.19,0 (Feb. 2007) Digital cellular telecommunications system (Phase 2+): Radio subsystem link control (3GPP TS 46.008 version 6.19.0 Release 6).
ETSI TS 125 305 V6.1 0 (Jun. 2004) Universal Mobile Telecommunications System (UMTS): User Equipment (UE) positioning in Universal Terrestrial Radio Access Network (UTRAN), Stage 2 (3GPP TS 25 305 version 6.1.0 Release 6).

* cited by examiner

METHOD AND APPARATUS OF TRACKING AREA ALLOCATION

CROSS-REFERENCE TO RELATED APPLICATIONS

This application claims the benefit of U.S. Provisional Patent application Ser. No. 60/895,578 entitled "TRACKING AREA ALLOCATION IN LTE" which was filed Mar. 19, 2007. The entirety of the aforementioned application is herein incorporated by reference.

BACKGROUND

I. Field

The following description relates generally to wireless communications, and more particularly to camping load balancing and optimization in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Area tracking within a wireless communication system enables a tracking area location for user equipment (e.g. mobile device, mobile communication apparatus, cellular device, smartphone, etc.) to be defined. Typically, a network can request or page the user equipment (UE) in which the UE can respond with such tracking area location. This enables the tracking area location of the UE to be communicated and updated to the network. Convention communication systems enforce the UE to reside on an optimal cell associated with a frequency on the network, wherein various cell reselection parameters can be utilized to transition the UE to different cells and/or tracking area locations. In general, controlling and managing UE volume and respective loads associated with networks can enable an increase with efficiency and availability of resources. However, if an increased amount of UE's reside on the same optimal cell, overload and decrease performance results.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating camping load balancing utilizing a frequency attribute. In a tracking area update procedure, each tracking area confirmed to user equipment can include an attribute of preferred, non-preferred, or forbidden. Based on such attribute, the user equipment can camp or idle on a particular cell for a specific frequency or network. The user equipment can camp on a cell from a preferred tracking area unless the quality of cells from the preferred frequency or network drops under a minimum threshold. The systems and methodologies provide a unified framework for camping load balancing across different Radio Access Technologies (RATs) and an optimization for the relevant signaling.

According to related aspects, a method that facilitates managing camping load balancing for at least one user equipment in a wireless communication system is described herein. The method can include locating a user equipment within a wireless communication system with a network request. The method can include receiving an attribute of a tracking area location for the user equipment according to the network request. Further, the method can comprise identifying the attribute as at least one of a preferred frequency, a non-preferred frequency, or a forbidden frequency. Moreover, the method can include selecting between one or more frequencies to utilize for communication based at least in part upon the attribute of the tracking area location. The method can additionally include transmitting a camping instruction for the user equipment to camp in a cell on the selected frequency.

Another aspect relates to a wireless communications apparatus. The wireless communications apparatus can include at least one processor configured to locate a user equipment within a wireless communication system with a network request, receive an attribute of a tracking area location for the user equipment according to the network request, identify the attribute as at least one of a preferred frequency, a non-preferred frequency, or a forbidden frequency; selecting between one or more frequencies to utilize for communication based at least in part upon the attribute of the tracking area location, and transmit a camping instruction for the user equipment to camp in a cell on the selected frequency. Further, the wireless communications apparatus can include a memory coupled to the at least one processor.

Yet another aspect relates to a wireless communications apparatus that enables distributing user equipment across one or more frequencies. The wireless communications apparatus can include means for locating a user equipment within a wireless communication system with a network request. Further, the wireless communications apparatus can comprise means for receiving an attribute of a tracking area location for the user equipment according to the network request. Further, the wireless communications apparatus can comprise means for identifying the attribute as at least one of a preferred frequency, a non-preferred frequency, or a forbidden frequency. Moreover, the wireless communications apparatus can include means for selecting between one or more frequencies to utilize for communication based at least in part upon the attribute of the tracking area location. The wireless communications apparatus can comprise means for transmitting a camping instruction for the user equipment to camp in a cell on the selected frequency.

Still another aspect relates to a computer program product having a computer-readable medium comprising code for causing at least one computer to locate a user equipment within a wireless communication system with a network request, to receive an attribute of a tracking area location for the user equipment according to the network request, to identify the attribute as at least one of a preferred frequency, a non-preferred frequency, or a forbidden frequency, to select between one or more frequencies to utilize for communication based at least in part upon the attribute of the tracking area location, and to transmit a camping instruction for the user equipment to camp in a cell on the selected frequency.

According to other aspects, a method that facilitates managing user equipment across one or more frequencies is described herein. The method can comprise receiving a network request to communicate a location for a user equipment. Additionally, the method can include transmitting an attribute of a tracking area location that corresponds to a user equipment based upon the network request. Further, the method can include receiving a determination that the attribute is at least one of a preferred frequency, a non-preferred frequency, or a forbidden frequency. Moreover, the method can include implementing a camping instruction to idle the user equipment on the tracking area location across one or more frequencies based at least in part upon the attribute.

Yet another aspect relates to a wireless communications apparatus that can include at least one processor configured to receiving a network request to communicate a location for a user equipment, transmitting a frequency attribute related to a tracking area location for a user equipment based upon the network request, receiving a determination that the attribute is at least one of a preferred frequency, a non-preferred frequency, or a forbidden frequency, and implementing a camping instruction to idle the user equipment on the tracking area location across one or more frequencies based at least in part upon the attribute. Further, the wireless communications apparatus can comprise a memory coupled to the at least one processor.

Another aspect relates to a wireless communications apparatus that enables management of camping load balancing in a wireless communication environment. The wireless communications apparatus can include means for receiving a network request to communicate a location for a user equipment. The wireless communications apparatus can include means for transmitting an indication status related to a tracking area location for a frequency based upon the network request. Moreover, the wireless communications apparatus can include means for receiving a determination that the attribute is at least one of a preferred frequency, a non-preferred frequency, or a forbidden frequency. Further, the wireless communications apparatus can include means for implementing a camping instruction to idle the user equipment on the tracking area location across one or more frequencies based at least in part upon the attribute.

Still another aspect relates to a computer program product having a computer-readable medium comprising code for causing at least one computer to receive a network request to communicate a location for a user equipment, to transmit an attribute of a tracking area location that corresponds to the user equipment based upon the network request, to receive a determination that the attribute is at least one of a preferred frequency, a non-preferred frequency, or a forbidden frequency, and to implement a camping instruction to idle the user equipment on the tracking area location across one or more frequencies based at least in part upon the attribute.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
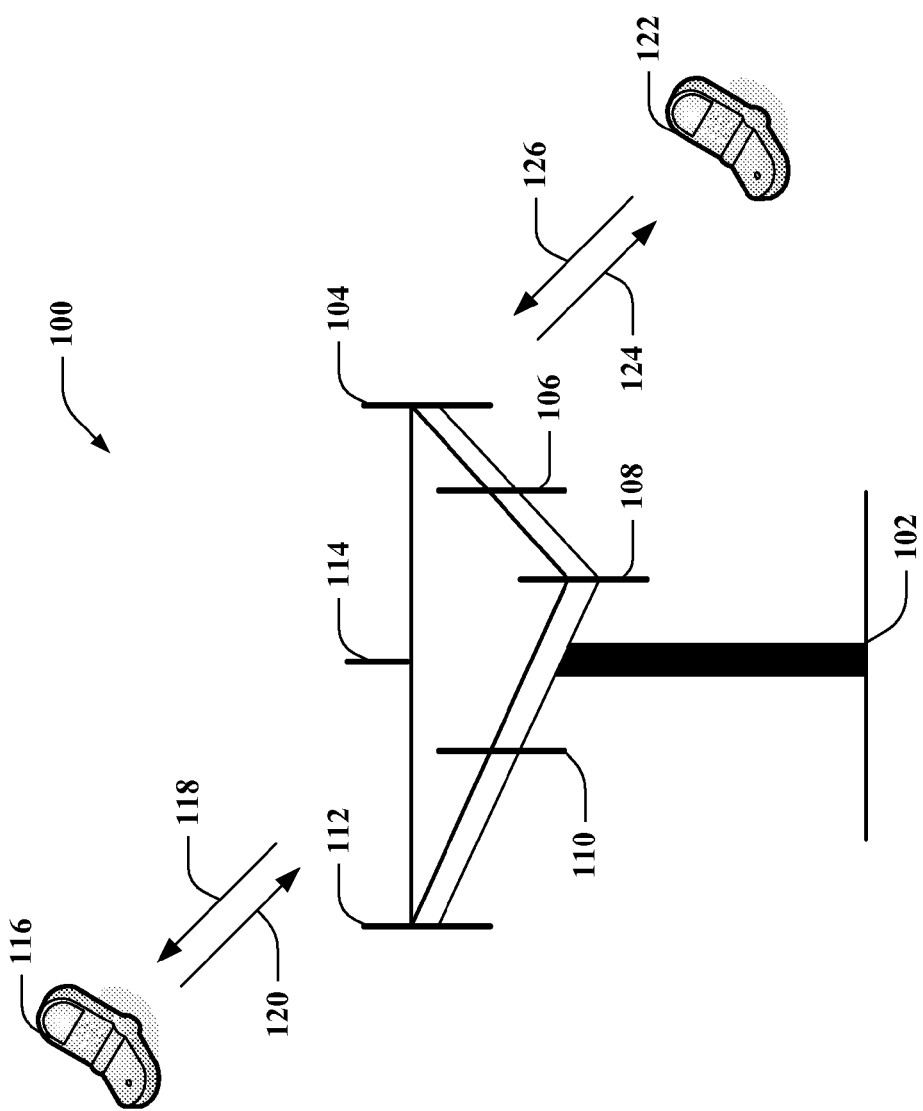
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device (s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, . . . ). For instance, base station 102 can utilize a particular technology for communicating with mobile devices (e.g. mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting—Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g. to a mobile device communicating via the second technology). For example, the pilot can use bit(s) to carry information about the presence of the first technology. Additionally, information such as a SectorID of the sector utilizing the first technology, a CarrierIndex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

Figure 2:
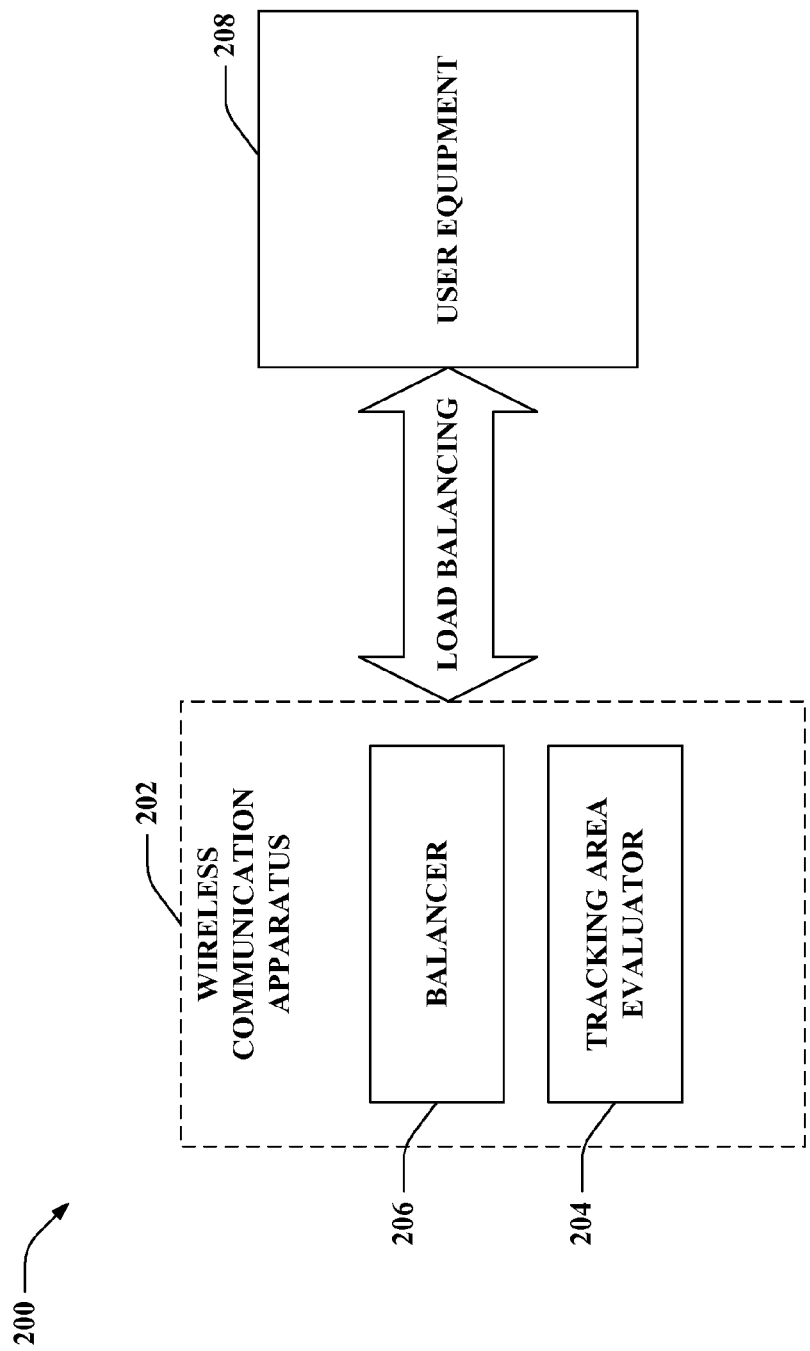
FIG. 2 is an illustration of an example system that enables load balancing of user equipment in accordance with the subject innovation.

With reference to FIG. 2, illustrated is a system 200 that enables load balancing of user equipment. For instance, system 200 can evaluate a confirmed tracking area related to user equipment 208 (e.g., mobile device, mobile communication device, smartphone, portable device, etc.) to identify at least one attribute, wherein the attribute can be at least one of a preferred, a non-preferred, or a forbidden. In general, the system 200 can camp or idle the user equipment 208 on a cell or tracking area location based at least in part upon the attribute. System 200 includes a wireless communication apparatus 202 that can communicate with one or more user equipment 208. Moreover, wireless communication apparatus 202 can communicate with other base station(s) and/or any disparate devices (e.g. servers, networks, etc.) (not shown) that can perform functions such as, for example, authentication, authorization, accounting, billing, and so forth. Thus, the wireless communication apparatus 202 can be, but is not limited to being, a portion of a network, a base station, a portion of user equipment, a node in a network, etc.

The wireless communication apparatus 202 can include a tracking area evaluator 204 that can ascertain a tracking area related to the user equipment 208. In particular, the user equipment 208 can reside on a tracking area location within a frequency or network, wherein the tracking area evaluator 204 can identify at least one frequency attribute related thereto. It is to be appreciated that the frequency attribute can be at least one of a preferred frequency, a non-preferred frequency, or a forbidden frequency. In other words, the tracking area evaluator 204 can determine an attribute that corresponds to at least one of the tracking area location or a frequency. For example, the user equipment 208 can be located on a first tracking area on a first network, whereas a second tracking area on an overlapping second network can exist. The tracking area evaluator 204 can identify the tracking area location of the user equipment 208 and/or any other overlapping tracking area location on disparate networks or frequencies. Moreover, such evaluation can identify the frequency attribute as at least one of preferred, non-preferred, or forbidden.

In another example, the tracking area evaluator 204 can receive instructions or data that defines or identifies frequency attributes for various networks, frequencies, tracking areas, and the like. In another example, the tracking area evaluator 204 can evaluate the tracking area location of the mobile device or the user equipment 208 in order to define such frequency attribute (e.g., preferred, non-preferred, forbidden, etc.). In general, it is to be appreciated that the frequency attribute can be defined by the user equipment 208, a base station, a network, a server, a service provider, a node within a network, and/or any other suitable entity related to a communications system.

The wireless communication apparatus 202 can further include a balancer 206 that can employ camping load balancing for one or more user equipment 208 based at least in part upon the evaluation of the frequency attribute. In general, the balancer 206 can distribute or maintain the idling or camping of the user equipment 208 based upon hierarchical criteria in accordance with the frequency attribute (also referred to as an indication status, attribute, etc.). Specifically, the balancer 206 can manage (e.g., maintain, switch, and/or any suitable combination thereof) user equipment 208 on one or more frequencies utilizing the frequency attribute as a determinative factor. The balancer 206 can ensure that the user equipment 208 is idle or camped at a frequency attribute that is preferred. Moreover, the balancer 206 can ensure such idling or camping at a preferred frequency attribute satisfies a minimum condition threshold. In one example, the minimum condition threshold can be S-criteria (e.g., in WCDMA system described in 3GPP TS25.304).

The balancer 206, generally, ensures that the user equipment 208 camps on a cell from a preferred tracking area as much as possible. It is to be appreciated that the balancer 206 will camp the user equipment 208 in a tracking area on a particular frequency if the minimum threshold is met. If there are no tracking areas with a preferred frequency attribute or no tracking areas with a preferred frequency attribute that satisfy the minimum threshold, the balancer 206 can camp the user equipment 208 in a tracking area location on a non-preferred frequency attribute. Furthermore, if the available networks and/or frequencies are preferred frequencies (e.g., no tracking area locations with non-preferred or forbidden frequency attributes), the balancer 206 can employ cell reselection parameters on the system information for camping and/or idling. Still further, the balancer 206 can camp the user equipment 208 in a tracking area location on a frequency that has a forbidden frequency attribute. Such camping can be implemented in the event that networks with a preferred or non-preferred attributes are unavailable. Additionally, the user equipment 208 can be assigned to a tracking area location with a forbidden frequency attribute if a non-preferred network is unavailable or if a preferred network does not include any cells or tracking areas that satisfy the threshold. Such assignment of the user equipment 208 to a tracking area on a forbidden frequency can ensure a tracking area update procedure is not initiated therewith (e.g., discussed in further detail in FIG. 5).

For example, if a mobile device is camped at a first tracking area on a first frequency that has a non-preferred attribute, the system 200 can transition (e.g., move, switch, etc.) the mobile device to an identified second overlapping frequency and tracking area which has a preferred attribute. In another example, the mobile device can be switched from camping on a preferred network on a first tracking area to a preferred network on a second tracking area if the first tracking area does not satisfy the minimum threshold (e.g., S-criteria). In still another example, the user equipment can be camped or idled on a network with a non-preferred attribute and placed in a cell based on cell reselection parameters if a preferred network is unavailable or if a tracking area location in a preferred network does not meet the minimum threshold. In yet another example, if one of a network with a preferred frequency attribute, a preferred network with a tracking area that does not meet the minimum threshold, or a non-preferred network is available, the mobile device can be idled and/or camped on a network that has a forbidden attribute.

The system 200 can balance camping load across frequencies and radio access technologies (RATs). In general, such load balancing can be important for mobility control in Long Term Evolution (LTE). It is desirable for the network to control the camping load per user equipment basis. The operator should be allowed to allocate different camping policies to user equipment depending on user equipment capability and/or a user's subscription profile. The system 200 can utilize a Non-access Stratum (NAS) protocol (e.g. Tracking Area Update procedure) which provides the following benefits: protocol changes are quite limited; a unified solution for camping load balancing over different RATs is provided; coping with diverse and frequent operator policy change on camping load balancing is provided; and the system 200 can be implemented utilizing reselection parameters on the system information.

Typical optimization utilizing cell reselection parameters includes numerous deficiencies. For example, in a WCDMA system, the cell reselection parameters are broadcast on the system information. One principle behind this is that the cell reselection parameters are common to all user equipment in the network, which can be detrimental by not allowing reselection to be specific to user equipment, service, and/or subscription policies. In another example, there is a proposed scheme in 3GPP to have different cell reselection parameters for each user equipment class, where each user equipment is assigned a user equipment class and uses corresponding cell reselection parameters. One drawback of this is that it uses multiple instances of cell reselection parameters for multiple user equipment classes. It also uses the assignment of a user equipment class to the user equipment, which would be done by dedicated signaling over the air. To make the camping load balancing control completely per user equipment basis, another proposal in 3GPP is to allocate the cell reselection parameters by the RRC Connection Release message. The user equipment uses the assigned cell reselection parameters after going to LTE_IDLE. This does not eliminate the need of sending cell reselection parameters on the system information since the network is not sure whether the user equipment will successfully receive the RRC Connection Release in all the cases. In addition, the protocol model is not optimal in the sense that parameters used in LTE_IDLE state are signaled to the user equipment to the user equipment in LTE_ACTIVE state. It is to be appreciated that the system 200 can eliminate and/or mitigate such issues discussed above.

Figure 3:
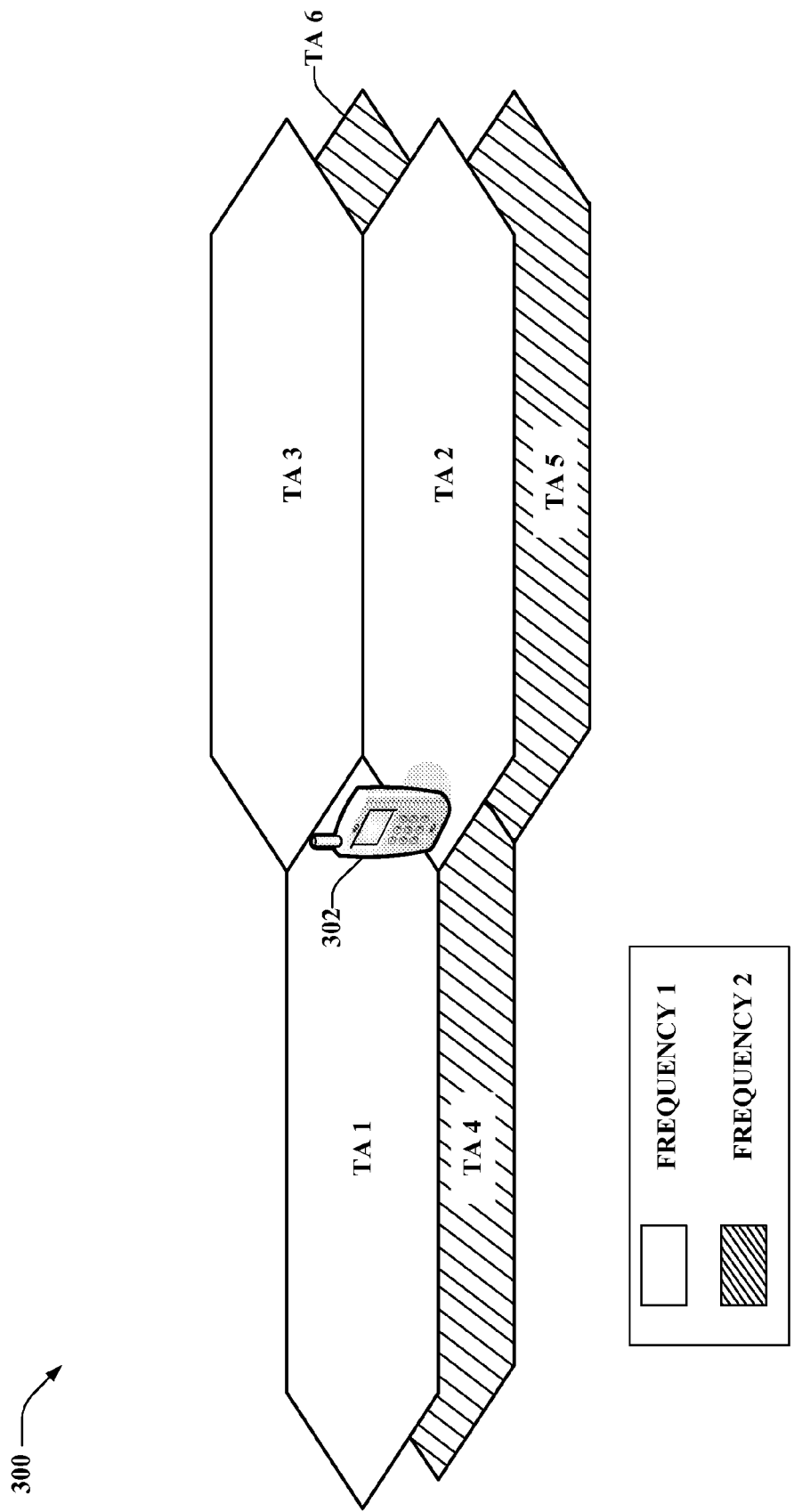
FIG. 3 is an illustration of an example system that manages a tracking area location between frequencies for user equipment in a wireless communication system.

Now referring to FIG. 3, illustrated is a system 300 that manages a tracking area location between frequencies for user equipment in a wireless communication. The system 300 illustrates a first frequency and a second frequency, wherein tracking areas associated with each can be overlapping. The system 300 can include a mobile device 302 (also referred to as user equipment (UE)). The mobile device 302 can reside on at least one of a tracking area 1 through 3 (designated as TA1, TA2, and TA3 respectively) on the first frequency. Moreover, the overlapping second frequency can include tracking areas 4 through 6 (designated as TA4, TA5, and TA6 respectively). In general, the first frequency and the second frequency can include attributes that can define on which network and ultimately which tracking area to camp or idle the mobile device 302.

The system 300 can employ a mechanism provided by the Non-access Stratum (NAS) layer. In particular, the Tracking Area Update procedure can be used for the control of camping load balancing. The NAS or Evolved Packet Core (EPC) can provide optimal access to the user equipment capability and/or the user's subscription profile. Moreover, a common framework can be provided for the camping load balancing across different Radio Access Technologies (RATs). The Tracking Area Update procedure automatically brings important functions to cope with diverse and frequent policy change on camping load balancing, which can be the area based and the periodical Tracking Area Update signaling.

It is to be appreciated that the mobile device 302 or user equipment can be confirmed with multiple tracking areas (TAs) at one Tracking Area Update (TAU) procedure. Moreover, it is possible that the operator deploys a network in such a manner that different tracking area identifications are used for different frequencies in the same area as illustrated in FIG. 3. Each tracking area (TA) in system 300 can be allocated with an attribute (e.g., frequency attribute, network attribute, etc.). As discussed, the attribute can be, but is not limited to being, preferred, non-preferred, or forbidden. In general, the system 300 attempts to camp or idle the mobile device 302 on a cell from a preferred tracking area within a network or frequency as much as possible.

Figure 4:
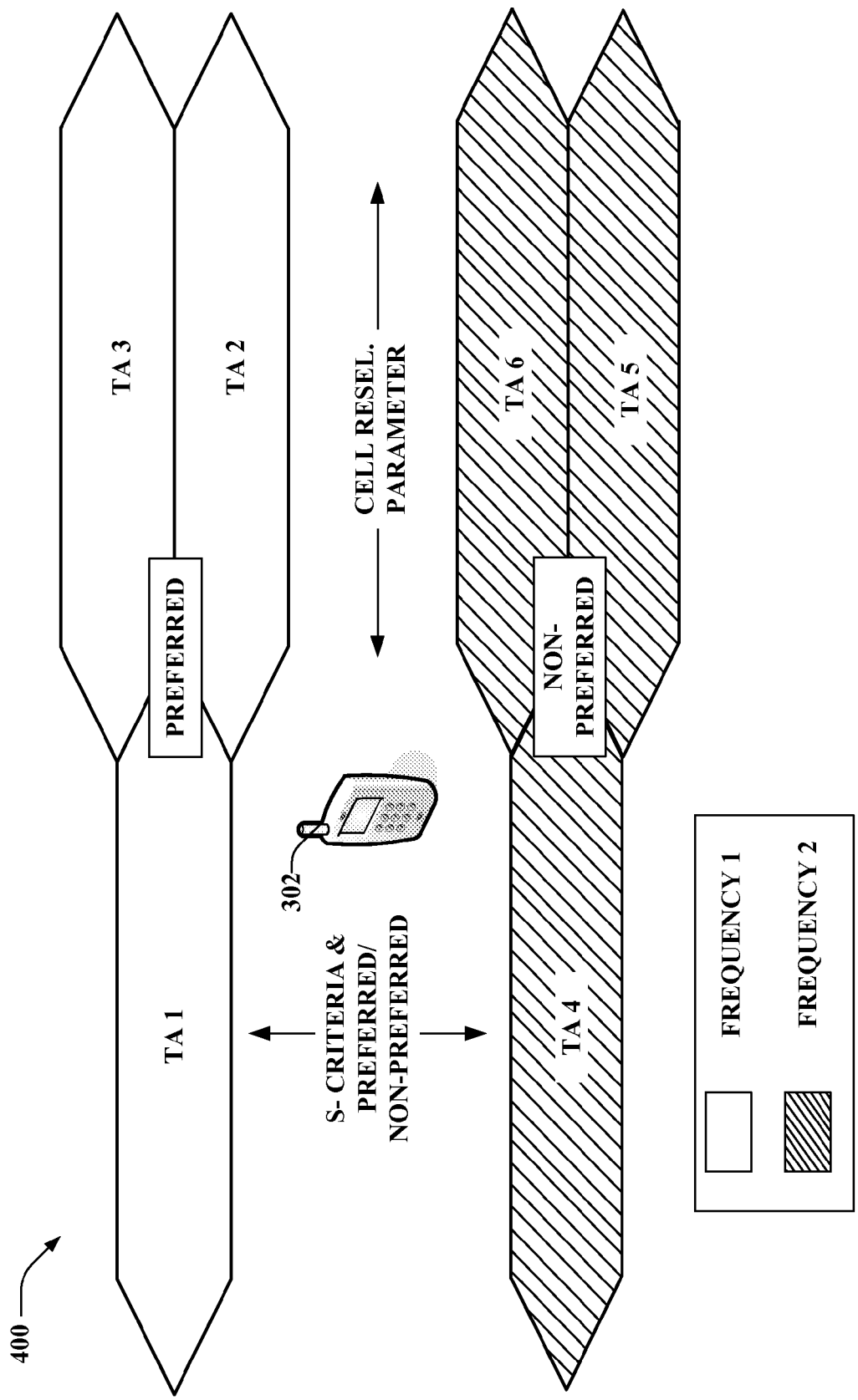
FIG. 4 is an illustration of an example system that manages user equipment between a preferred frequency and a non-preferred frequency based at least in part upon a threshold.

For example, if the user equipment or mobile device 302 is allocated to TA1 to TA3 as "preferred" and TA4 to TA6 as "non-preferred" in the situation illustrated in the system 300, the mobile device 302 is maintained in the first frequency unless the quality of cells from the first frequency drops under a certain threshold (e.g., S-criteria). This principle can override the inter-frequency cell reselection parameters broadcast on the system information. In particular, FIG. 4 illustrates a system 400 that manages user equipment between a preferred frequency and a non-preferred frequency based at least in part upon a minimum threshold. The mobile device 302 in the system 400 can be idled or camped on the first frequency as long as the minimum threshold S-criteria is satisfied. In other words, based on the tracking areas TA1-TA3 being preferred and satisfying the threshold, the mobile device 302 will camp on the first frequency rather than TA4-TA6 on a non-preferred attributed second frequency. It is to be appreciated that the vertical mobility over frequencies can be controlled by a threshold (e.g., S-criteria) and the TA attributes (e.g., preferred, non-preferred, forbidden, etc.), and the horizontal mobility within frequency can be controlled by cell reselection parameters. Thus, the vertical mobility can supersede inter-frequency cell reselection behavior defined by the system information. It is to be further appreciated that the network pages both the user equipment (mobile device 302) both in the preferred TAs and non-preferred TAs and therefore camping on a non-preferred TA does not mean that the UE cannot get a service.

Figure 5:
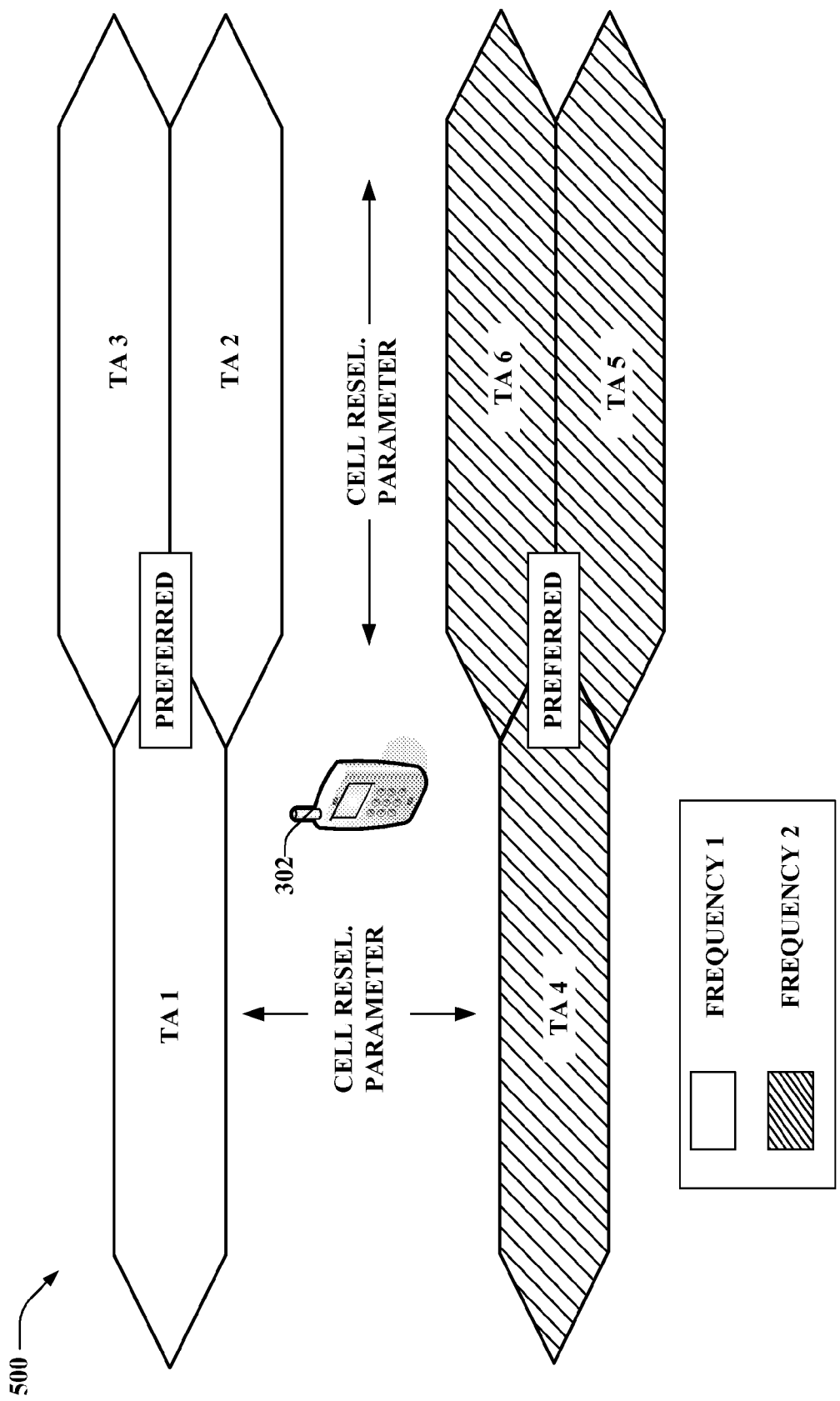
FIG. 5 is an illustration of an example system that balances camping load for user equipment between tracking area locations across preferred frequencies.

Turning to FIG. 5, a system 500 is illustrated that balances camping load for user equipment between tracking area locations across preferred frequencies. In other words, frequencies or networks can be available that are preferred attributed (e.g., non-preferred networks unavailable, forbidden networks unavailable, etc.). In such a scenario, it is possible to not apply camping load balancing in the network where different TAs are used for different frequencies by allocating TAs from the frequencies as preferred. Thus, switching the mobile device 302 between various network and frequencies can be implemented yet such various frequencies and networks are preferred. The mobile device 302 can utilize cell reselection parameters on the system information for camping load balancing in a wireless communication system. This technique is employed in the system 500 with no camping load balancing (e.g., utilizing cell reselection parameters).

In another instance, Tracking Area Update procedure utilizing NAS can be extended to support the allocation of tracking areas with the proposed attributes. In other words, tracking areas from 2 G/3 G are also allocated with an attribute such as preferred, non-preferred, or forbidden. Thus, an operator can involve inter-RAT idle mode mobility in the camping load balancing control. An advantage of this is that it can provide a unified framework for camping load balancing control over different Radio Access Technologies (RATs). Moreover, this does not require changes to the cell reselection parameters in legacy systems.

As previously discussed, the forbidden attribute can be associated with a tracking area related to a network or frequency. In the WCDMA system, a TA is declared as forbidden when the user equipment could not get a positive acknowledgement from the network in the Tracking Area Update procedure. In LTE, in which the multiple TA concept is employed, forbidden TAs can be actively "allocated" to the user equipment or mobile device 302. This can reduce unnecessary Tracking Area Update procedures that would end up in a failure. Thus, if the user equipment or mobile device 302 is actually assigned to a forbidden TA, the user equipment or mobile device 302 does not try to initiate a Tracking Area Update procedure towards the forbidden TA. Moreover, the user equipment or mobile device 302 can camp on a forbidden tracking area with "limited service state" if a suitable cell cannot be found.

Figure 6:
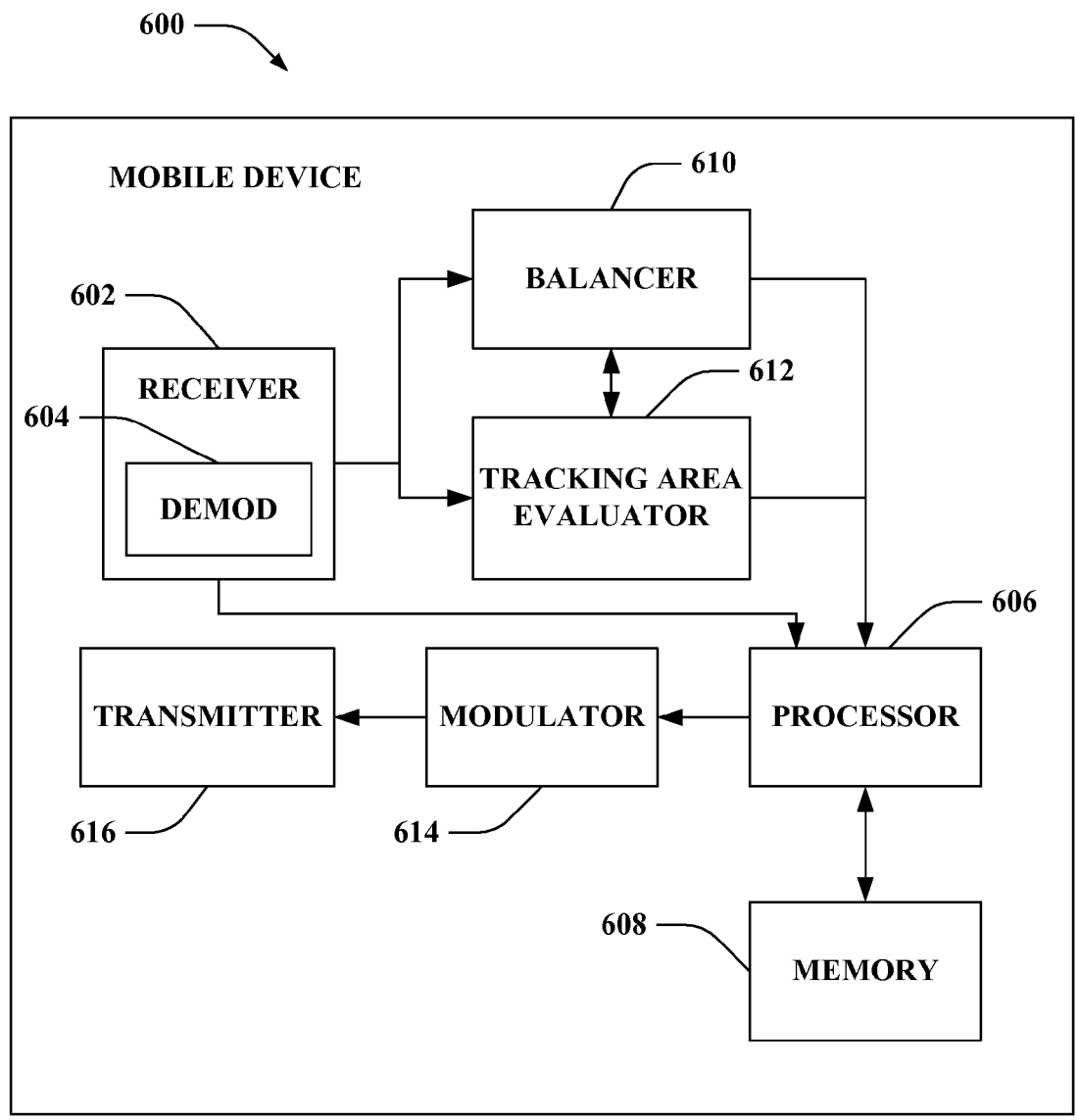
FIG. 6 is an illustration of an example mobile device that facilitates employing camping load balancing in a wireless communication system.

FIG. 6 is an illustration of a mobile device 600 that facilitates employing camping load balancing in a wireless communication system. Mobile device 600 comprises a receiver 602 that receives a signal from, for instance, a receive antenna (not shown), and performs typical actions thereon (e.g., filters, amplifies, downconverts, etc.) the received signal and digitizes the conditioned signal to obtain samples. Receiver 602 can be, for example, an MMSE receiver, and can comprise a demodulator 604 that can demodulate received symbols and provide them to a processor 606 for channel estimation. Processor 606 can be a processor dedicated to analyzing information received by receiver 602 and/or generating information for transmission by a transmitter 616, a processor that controls one or more components of mobile device 600, and/or a processor that both analyzes information received by receiver 602, generates information for transmission by transmitter 616, and controls one or more components of mobile device 600.

Mobile device 600 can additionally comprise memory 608 that is operatively coupled to processor 606 and that can store data to be transmitted, received data, information related to a frequency attribute, data associated with a tracking area for user equipment, and any other suitable information for determining a tracking area location of user equipment or identifying a frequency attribute for a tracking area location. Memory 608 can additionally store protocols and/or algorithms associated with managing camping or idling for user equipment across various frequencies, networks, tracking areas, and the like based at least in part upon the frequency attribute corresponding to the user equipment.

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 608 of the subject systems and methods is intended to comprise, without being limited to, these and any other suitable types of memory.

Receiver 602 is further operatively coupled to a tracking area evaluator 610 that evaluates tracking areas, tracking area locations, frequency attributes, and the like received by receiver 602. Tracking area evaluator 610 can identify, determine, and/or assign a frequency attribute to a tracking area location to which user equipment is located or residing upon. Thus, pursuant to an example, the tracking area evaluator 610 can determine a frequency or network attribute as at least one of a preferred, a non-preferred, or a forbidden in order to utilize such attribute for camping or idling user equipment. Additionally, a balancer 610 can employ such camping load balancing for user equipment based at least in part upon the frequency attribute for user equipment and tracking areas on various frequencies or networks (e.g., overlapping frequencies, etc.). In other words, the balancer 610 can switch or maintain the frequency or network a mobile device (e.g. user equipment) resides upon based on the attribute of such tracking area location. Mobile device 600 still further comprises a modulator 614 and a transmitter 616 that transmits the signal to, for instance, a base station, another mobile device, etc. Although depicted as being separate from the processor 606, it is to be appreciated that the tracking area evaluator 610, the balancer 612 and/or modulator 614 can be part of processor 606 or a number of processors (not shown).

Figure 7:
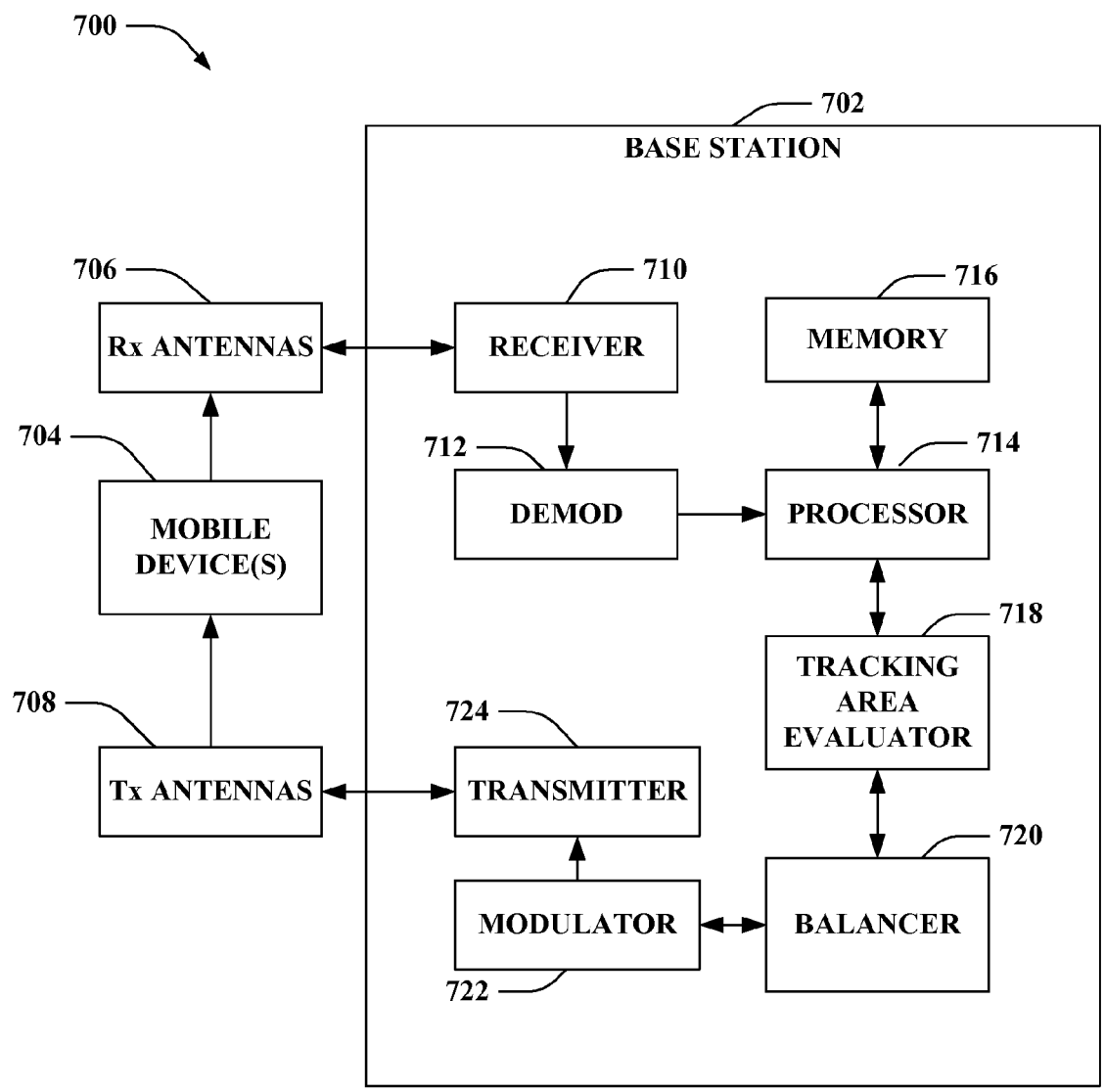
FIG. 7 is an illustration of an example system that facilitates providing camping load balancing across frequencies and radio access technologies (RAT) in a wireless communication environment.

FIG. 7 is an illustration of a system 700 that facilitates providing camping load balancing across frequencies and Radio Access Technologies (RATs) in a wireless communication environment. System 700 comprises a base station 702 (e.g., access point, . . . ) with a receiver 710 that receives signal(s) from one or more mobile devices 704 through a plurality of receive antennas 706, and a transmitter 722 that transmits to the one or more mobile devices 704 through a transmit antenna 708. Receiver 710 can receive information from receive antennas 706 and is operatively associated with a demodulator 712 that demodulates received information. Demodulated symbols are analyzed by a processor 714 that can be similar to the processor described above with regard to FIG. 6, and which is coupled to a memory 716 that stores information related to generating pilot(s), data to be transmitted to or received from mobile device(s) 704 (or a disparate base station (not shown)), and/or any other suitable information related to performing the various actions and functions set forth herein. Processor 714 is further coupled to a tracking area evaluator 718 that determines frequency attributes related to tracking areas associated with mobile device(s) 704. The tracking area evaluator 718 can identify a frequency attribute related to a particular cell and/or tracking area on a frequency on which a mobile device or user equipment resides.

Tracking area evaluator 718 can be operatively coupled to a balancer 720 that manages camping or idling for mobile devices or user equipment based upon the evaluation of the frequency attribute yielded by the tracking area evaluator 718. For example, balancer 720 can assign user equipment to a frequency or network based upon information stored in memory 716 (e.g., frequency attribute identified for user equipment). Further, balancer 720 (and/or tracking area evaluator 718) can provide the frequency or network assignments to a modulator 722. Modulator 722 can multiplex assignments for transmission by a transmitter 726 through antenna 708 to mobile device(s) 704. Although depicted as being separate from the processor 714, it is to be appreciated that tracking area evaluator 718, balancer 720 and/or modulator 722 can be part of processor 714 or a number of processors (not shown).

Figure 8:
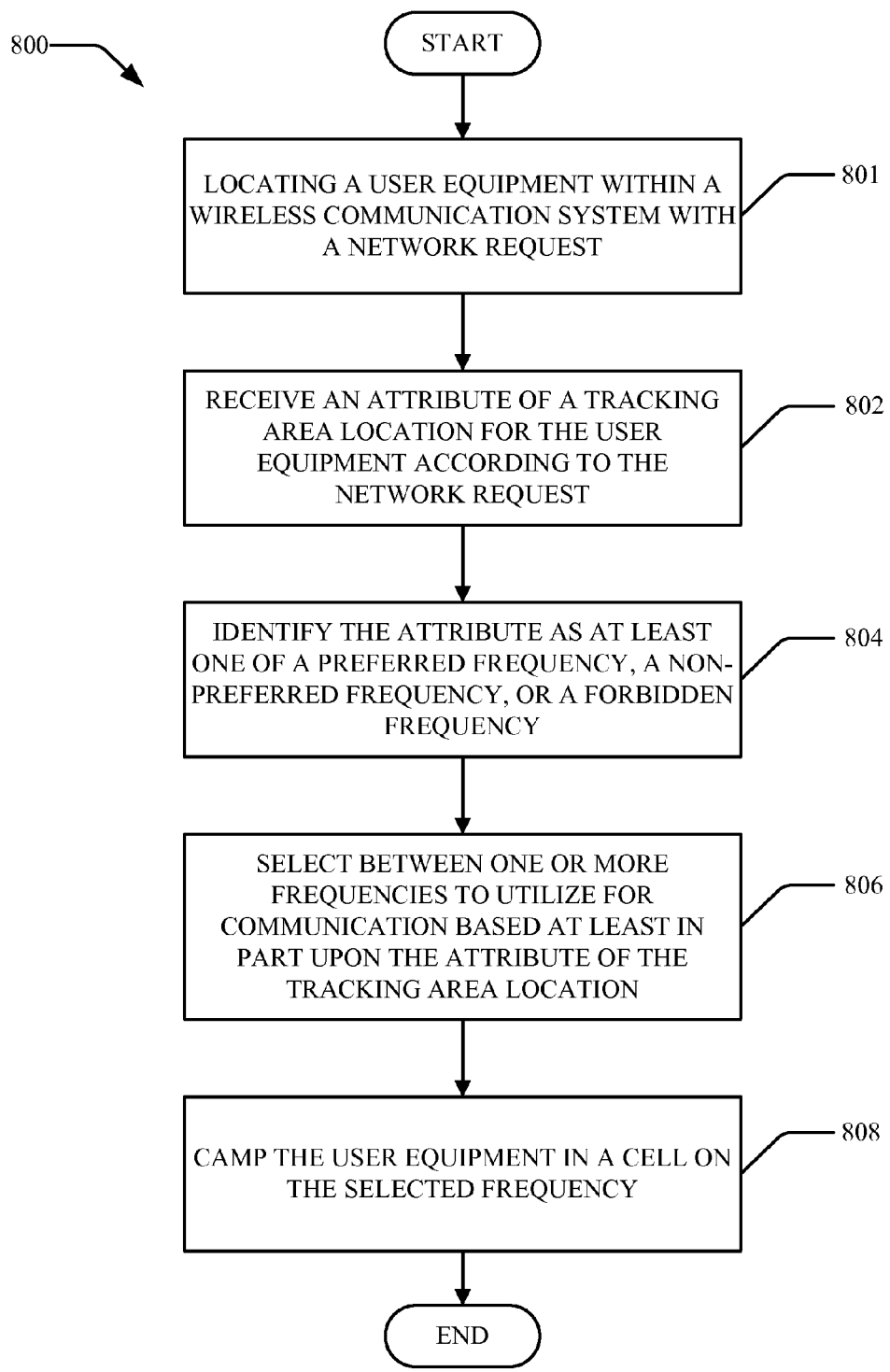
FIG. 8 is an illustration of an example methodology that facilitates distributing user equipment across one or more frequencies in a wireless communication environment.
Figure 9:
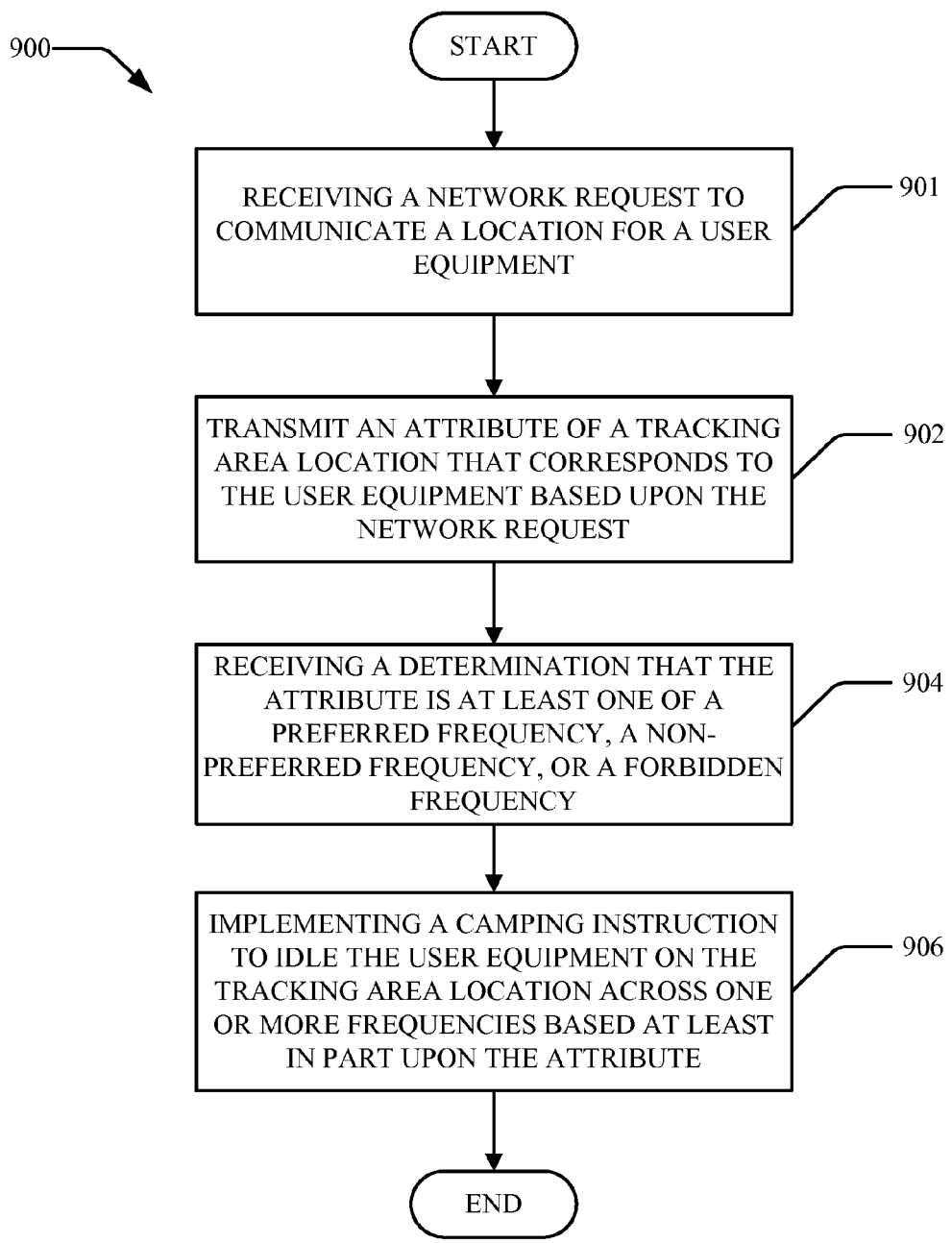
FIG. 9 is an illustration of an example methodology that facilitates ensuring user equipment is idle in a preferred frequency in a wireless communication environment.

Referring to FIGS. 8-9, methodologies relating to utilizing pilot(s) to enable inter-technology handoffs in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 8, illustrated is a methodology 800 that facilitates distribution of user equipment across one or more frequencies in a wireless communication environment. Generally, the methodology 800 can provide tracking area allocation, wherein each tracking area can be assigned to user equipment with at least one of the following attributes: preferred; non-preferred; or forbidden. The methodology 800 can enable limited protocol revisions. Such technique can be a unified solution for camping load balancing over different RATs. The methodology 800 can further cope with diverse and frequent operator policy change on camping load balancing. Moreover, no additional parameters than common reselection parameters on the system information are utilized.

At reference numeral 801, the method may include locating a user equipment within a wireless communication system with a network request At reference numeral 802, an attribute of a tracking area location for a portion of user equipment can be received according to the network request. In particular, the attribute of a tracking area location can correspond to a particular cell on a specific network or frequency. At reference numeral 804, the attribute can be identified as at least one of a preferred frequency, a non-preferred frequency, or a forbidden frequency. At reference numeral 806, one of more frequencies can be selected for communication based at least in part upon the attribute of the tracking area location for user equipment. In particular, the selection of the frequency can be based on the attribute and is one of the preferred frequency that satisfies a minimum S-criteria threshold, the non-preferred frequency if a preferred frequency that satisfies the minimum S-criteria threshold is unavailable, or the forbidden frequency if the non-preferred frequency is unavailable and the preferred frequency that satisfies the minimum S-criteria threshold is unavailable. At reference numeral 808, the user equipment can be camped in a cell on the selected frequency.

Turning to FIG. 9, illustrated is a methodology 900 that facilitates ensuring user equipment is idle in a preferred frequency in a wireless communication system. At reference numeral 910, the method may include receiving a network request to communicate a location for a user equipment. At reference numeral 902, an attribute of a tracking area location that corresponds to the user equipment can be transmitted based upon the network request. For instance, a tracking area location of a mobile device on a particular network or frequency can be communicated. At reference numeral 904, a determination can be made whether the attribute is at least one of a preferred frequency, a non-preferred frequency, or a forbidden frequency. In one example, a listing of frequencies or networks can be provided that define such frequency attribute. In another example, based on the tracking area location, the frequency attribute can be identified.

Continuing at reference numeral 906, the user equipment tracking area location can be managed across one or more frequencies based at least in part upon the attribute. In general, the user equipment can be camped or idled on a preferred frequency as much as possible. Yet, the camping can be in a preferred frequency that satisfies a minimum threshold (e.g., S-criteria). In the event a cell in an available preferred frequency does not satisfy the minimum threshold or a preferred frequency is unavailable, the mobile device can be camped on a non-preferred frequency. In the event a cell in an available preferred frequency does not satisfy the minimum threshold, is unavailable, and/or a non-preferred frequency is unavailable, the mobile device can camp or idle on a forbidden frequency.

It will be appreciated that, in accordance with one or more aspects described herein, inferences can be made regarding utilizing pilots to enable inter-technology handoffs. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences related to identifying or determining a frequency attribute for a specific frequency or network. By way of further illustration, an inference can be made related to identifying a tracking area in which a mobile device resides. It will be appreciated that the foregoing examples are illustrative in nature and are not intended to limit the number of inferences that can be made or the manner in which such inferences are made in conjunction with the various embodiments and/or methods described herein.

Figure 10:
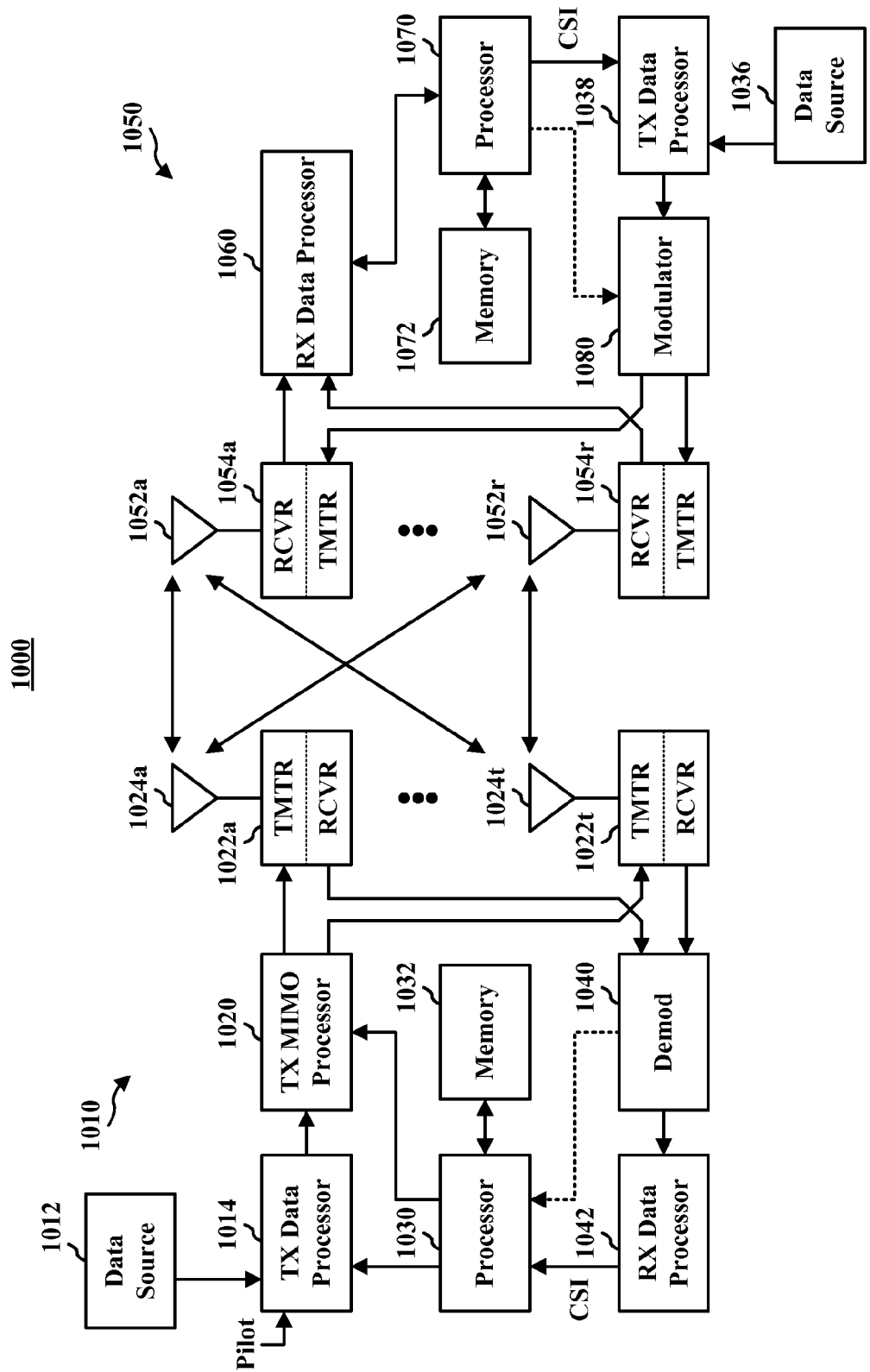
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1-7 and 10-12) and/or methods (FIGS. 8-9) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which available technology to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
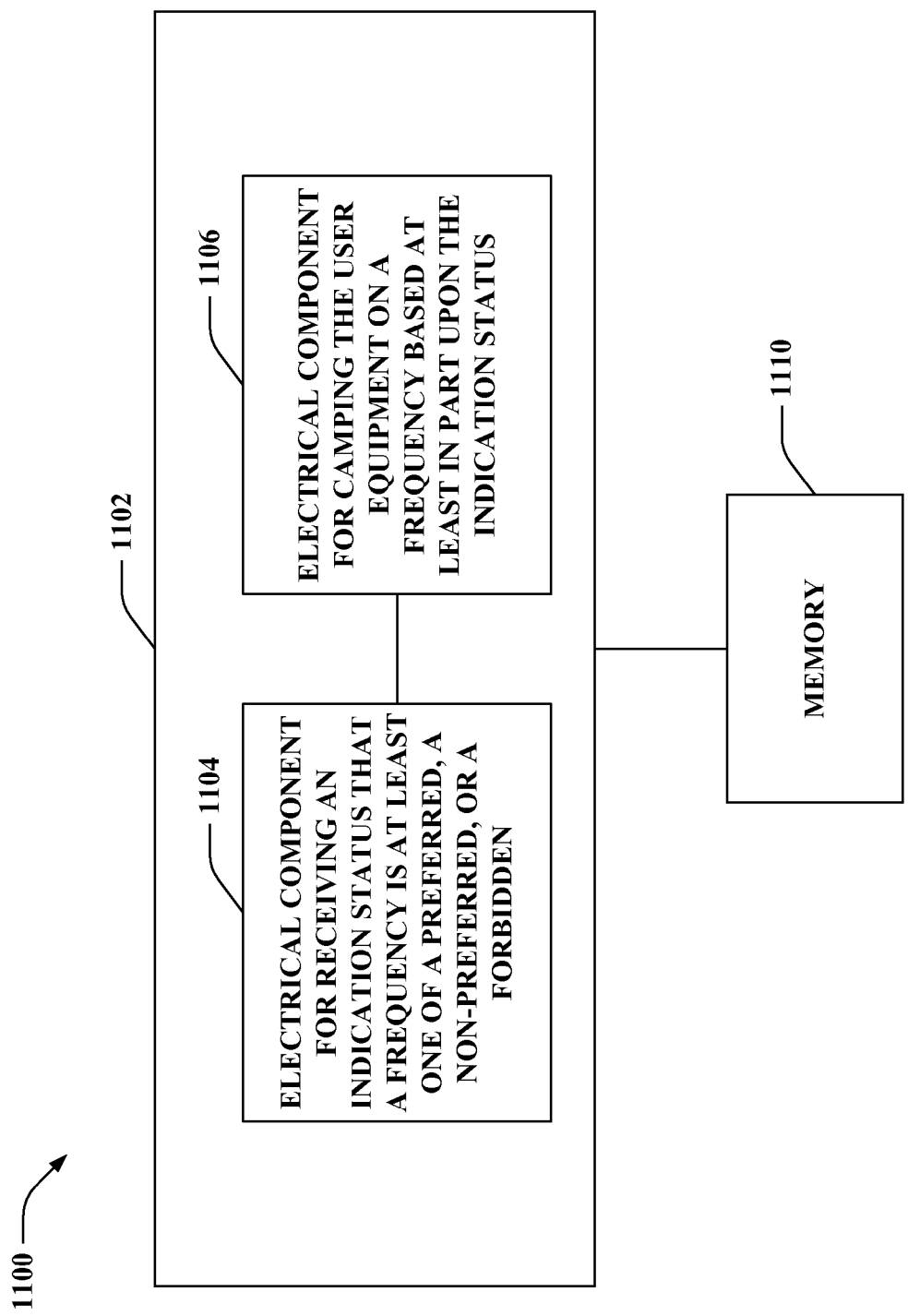
FIG. 11 is an illustration of an example system that facilitates camping load balancing in a wireless communication environment.

With reference to FIG. 11, illustrated is a system 1100 that facilitates camping load balancing in a wireless communication environment. For example, system 1100 can reside at least partially within a mobile device. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for receiving an indication status that a frequency is at lest one of a preferred, a non-preferred, or a forbidden 1104. Further, logical grouping 1102 can comprise an electrical component for camping the user equipment on a frequency based at least in part upon the indication status 1106. For example, a mobile device can be managed between frequencies based on the frequency attribute which can supersede inter-cell mobility based on cell reselection parameters. Additionally, system 1100 can include a memory 1110 that retains instructions for executing functions associated with electrical components 1104 and 1106. While shown as being external to memory 1110, it is to be understood that one or more of electrical components 1104 and 1106 can exist within memory 1110.

Figure 12:
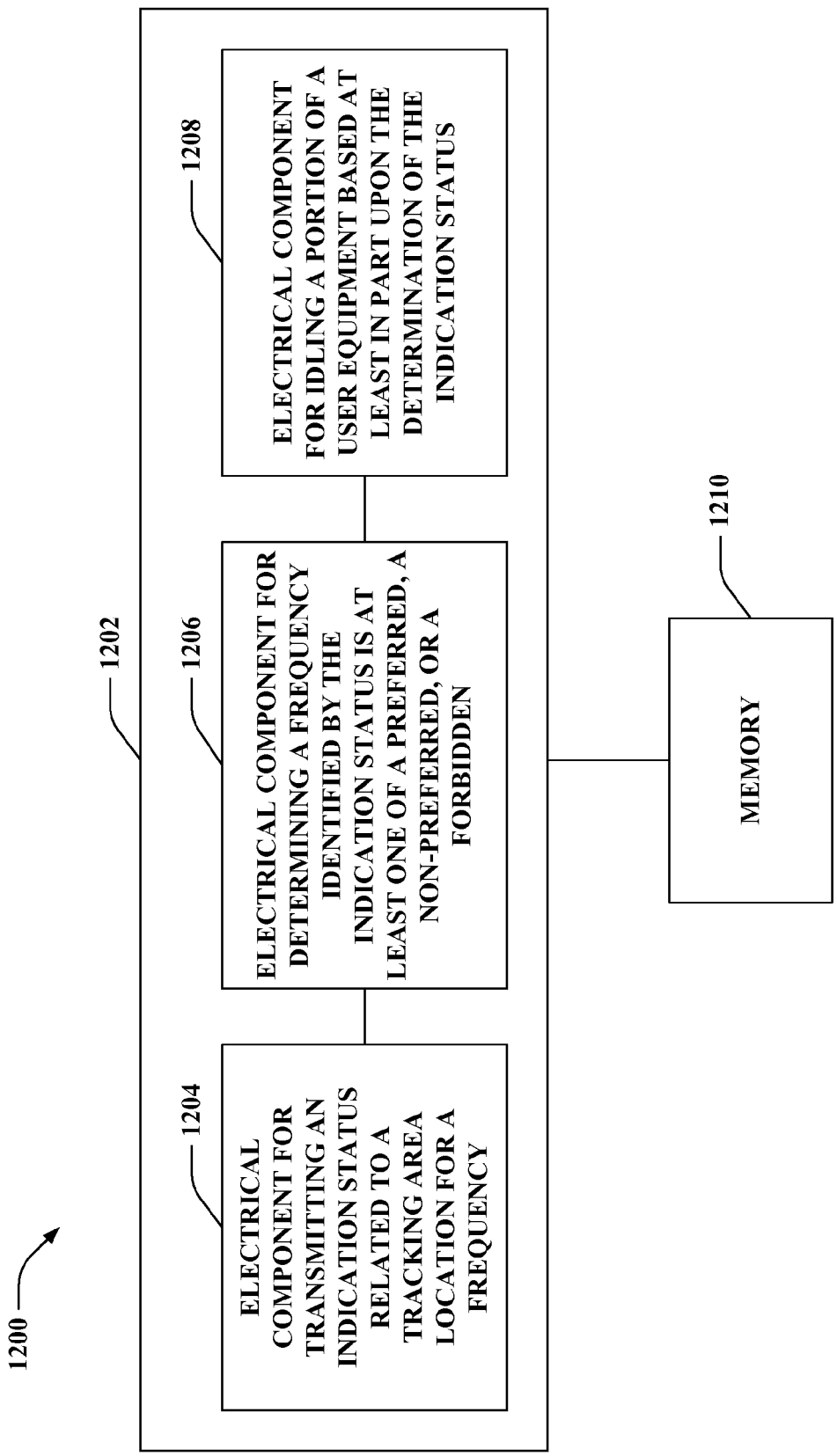
FIG. 12 is an illustration of an example system that enables determining a frequency attribute corresponding to a tracking area location in a wireless communication environment.

Turning to FIG. 12, illustrated is a system 1200 that determining a frequency attribute corresponding to a tracking area location in a wireless communication environment. System 1200 can reside within a base station, for instance. As depicted, system 1200 includes functional blocks that can represent functions implemented by a processor, software, or combination thereof (e.g., firmware). System 1200 includes a logical grouping 1202 of electrical components that can act in conjunction. Logical grouping 1202 can include an electrical component for transmitting an indication status related to a tracking area location for a frequency 1204. Moreover, logical grouping 1202 can include an electrical component for determining a frequency identified by the indication status is at least one of a preferred, a non-preferred, or a forbidden 1206. For example, based on the tracking area location of the mobile device, the frequency or network can be evaluated to identify the indication status. Further, logical grouping 1202 can include an electrical component for idling a portion of the user equipment based at least in part upon the determination of the indication status 1208. For example, a mobile device can be switched from a non-preferred frequency attribute and cell to be camped or idled on a cell in a preferred frequency attribute network. Additionally, system 1200 can include a memory 1210 that retains instructions for executing functions associated with electrical components 1204, 1206, and 1208. While shown as being external to memory 1210, it is to be understood that electrical components 1204, 1206, and 1208 can exist within memory 1210.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates managing camping load balancing for at least one user equipment in a wireless communication system, comprising:
    locating a user equipment within the wireless communication system with a network request, from a network node;
    receiving an attribute of a tracking area location for the user equipment according to the network request;
    identifying the attribute as at least one of a preferred frequency, a non-preferred frequency, or a forbidden frequency;
    selecting between one or more frequencies to utilize for communication based at least in part upon the attribute of the tracking area location, wherein the selecting between one or more frequency includes switching from a frequency corresponding to a tracking area having the preferred frequency attribute to a frequency corresponding to a tracking area having the non-preferred frequency attribute when a quality condition drops below a threshold condition, wherein the threshold condition is a S-criteria threshold; and
    transmitting, from the network node, a camping instruction for the user equipment to camp in a cell on the selected frequency.

2. The method of claim 1, wherein the one or more frequencies correspond to different overlapping tracking areas, respectively.

3. The method of claim 2, wherein a first one of the different overlapping tracking areas has a preferred attribute and a second one of the different overlapping tracking areas has a non-preferred attribute.

4. The method of claim 1, wherein said selecting between one or more frequencies includes idling in a frequency corresponding to a tracking area having the preferred frequency attribute while a threshold condition remains satisfied.

5. The method of claim 1, further comprising utilizing at least one of a Non-access Stratum (NAS) protocol or an Evolved Packet Core (EPC) protocol to camp the user equipment based on the attribute to enhance accessibility to capability related to the user equipment and a subscription profile related to the user equipment.

6. The method of claim 1, further comprising providing uniform camping load balancing across disparate Radio Access Technologies (RATs), wherein control of the camping load balancing involves inter-RAT idle mode mobility.

7. The method of claim 1, further comprising enabling a vertical mobility associated with S-criteria and the attribute to supersede horizontal mobility associated with cell reselection parameters.

8. The method of claim 1, further comprising allocating the forbidden frequency to the user equipment to camp with a limited service state to reduce tracking area update procedure if the preferred frequency is unavailable, a cell with a minimum threshold in the preferred frequency is unavailable, and the non-preferred frequency is unavailable.

9. A wireless communications apparatus, comprising:
    at least one processor configured to:
        locate a user equipment within a wireless communication system with a network request, from a network node;
        receive an attribute of a tracking area location for the user equipment according to the network request;
        identify the attribute as at least one of a preferred frequency, a non-preferred frequency, or a forbidden frequency;
        select between one or more frequencies to utilize for communication based at least in part upon the attribute of the tracking area location, wherein the selecting between one or more frequency includes switching from a frequency corresponding to a tracking area having the preferred frequency attribute to a frequency corresponding to a tracking area having the non-preferred frequency attribute when a quality condition drops below a threshold condition, wherein the threshold condition is a S-criteria threshold; and
        transmit, from the network node, a camping instruction for the user equipment to camp in a cell on the selected frequency; and
    a memory coupled to the at least one processor.

10. The wireless communications apparatus of claim 9, wherein the one or more frequencies correspond to different overlapping tracking areas, respectively.

11. The wireless communications apparatus of claim 10, wherein a first one of the different overlapping tracking areas has a preferred attribute and a second one of the different overlapping tracking areas has a non-preferred attribute.

12. The wireless communications apparatus of claim 11, wherein the at least one processor is further configured to idle in a frequency corresponding to a tracking area having the preferred frequency attribute while a threshold condition remains satisfied.

13. The wireless communications apparatus of claim 9, wherein the at least one processor is further configured to utilize at least one of a Non-access Stratum (NAS) protocol or an Evolved Packet Core (EPC) protocol to camp the user equipment based on the attribute to enhance accessibility to capability related to the user equipment and a subscription profile related to the user equipment.

14. The wireless communications apparatus of claim 9, wherein the at least one processor is further configured to provide uniform camping load balancing across disparate Radio Access Technologies (RATs), wherein control of the camping load balancing involves inter-RAT idle mode mobility.

15. The wireless communications apparatus of claim 9, wherein the at least one processor is further configured to enable a vertical mobility associated with S-criteria and the attribute to supersede horizontal mobility associated with cell reselection parameters.

16. The wireless communications apparatus of claim 9, wherein the at least one processor is further configured to allocate the forbidden frequency to the user equipment to camp with a limited service state to reduce tracking area update procedure if the preferred frequency is unavailable, a cell with a minimum threshold in the preferred frequency is unavailable, and the non-preferred frequency is unavailable.

17. A wireless communications apparatus that enables distributing user equipment across one or more frequencies in a wireless communication network, comprising:
    means for locating a user equipment within a wireless communication system with a network request, from a network node;
    means for receiving an attribute of a tracking area location for the user equipment according to the network request;
    means for identifying the attribute as at least one of a preferred frequency, a non-preferred frequency, or a forbidden frequency;
    means for selecting between one or more frequencies to utilize for communication based at least in part upon the attribute of the tracking area location, wherein the means for selecting between one or more frequency includes means for switching from a frequency corresponding to a tracking area having the preferred frequency attribute to a frequency corresponding to a tracking area having the non-preferred frequency attribute when a quality condition drops below a threshold condition, wherein the threshold condition is a S-criteria threshold; and
    means for transmitting, from a network node, a camping instruction for the user equipment to camp in a cell on the selected frequency.

18. The wireless communications apparatus of claim 17, wherein the one or more frequencies correspond to different overlapping tracking areas, respectively.

19. The wireless communications apparatus of claim 18, wherein a first one of the different overlapping tracking areas has a preferred attribute and a second one of the different overlapping tracking areas has a non-preferred attribute.

20. The wireless communications apparatus of claim 17, wherein said means for selecting between one or more frequencies includes means for idling in a frequency corresponding to a tracking area having the preferred frequency attribute while a threshold condition remains satisfied.

21. The wireless communications apparatus of claim 17, further comprising means for utilizing at least one of a Non-access Stratum (NAS) protocol or an Evolved Packet Core (EPC) protocol to camp the user equipment based on the attribute to enhance accessibility to capability related to the user equipment and a subscription profile related to the user equipment.

22. The wireless communications apparatus of claim 17, further comprising means for providing uniform camping load balancing across disparate Radio Access Technologies (RATs), wherein control of the camping load balancing involves inter-RAT idle mode mobility.

23. The wireless communications apparatus of claim 17, further comprising means for enabling a vertical mobility associated with S-criteria and the attribute to supersede horizontal mobility associated with cell reselection parameters.

24. The wireless communications apparatus of claim 17, further comprising means for allocating the forbidden frequency to the user equipment to camp with a limited service state to reduce tracking area update procedure if the preferred frequency is unavailable, a cell with a minimum threshold in the preferred frequency is unavailable, and the non-preferred frequency is unavailable.

25. A computer program product stored on a non-transitory computer readable medium and executable by a processor to cause at least one computer to:
    locate a user equipment within a wireless communication system with a network request, from a network node;
    receive an attribute of a tracking area location for the user equipment according to the network request;
    identify the attribute as at least one of a preferred frequency, a non-preferred frequency, or a forbidden frequency;
    select between one or more frequencies to utilize for communication based at least in part upon the attribute of the tracking area location, wherein the selecting between one or more frequency includes switching from a frequency corresponding to a tracking area having the preferred frequency attribute to another frequency corresponding to another tracking area having the non-preferred frequency attribute when a quality condition drops below a threshold condition, wherein the threshold condition is a S-criteria threshold; and
    transmit, from the network node, a camping instruction for the user equipment to camp in a cell on the selected frequency.

26. The computer program product of claim 25, wherein the one or more frequencies correspond to different overlapping tracking areas, respectively.

27. The computer program product of claim 26, wherein a first one of the different overlapping tracking areas has a preferred attribute and a second one of the different overlapping tracking areas has a non-preferred attribute.

28. The computer program product of claim 25, further executable by the processor to cause the at least one computer to idle in a frequency corresponding to a tracking area having the preferred frequency attribute while a threshold condition remains satisfied.

29. The computer program product of claim 25, further executable by the processor to cause the at least one computer to utilize at least one of a Non-access Stratum (NAS) protocol or an Evolved Packet Core (EPC) protocol to camp the user equipment based on the attribute to enhance accessibility to capability related to the user equipment and a subscription profile related to the user equipment.

30. The computer program product of claim 25, further executable by the processor to cause the at least one computer to provide uniform camping load balancing across disparate Radio Access Technologies (RATs), wherein control of the camping load balancing involves inter-RAT idle mode mobility.

31. The computer program product of claim 25, further executable by the processor to cause the at least one computer to enable a vertical mobility associated with 5-criteria and the attribute to supersede horizontal mobility associated with cell reselection parameters.

32. The computer program product of claim 25, further executable by the processor to cause the at least one computer to allocate the forbidden frequency to the user equipment to camp with a limited service state to reduce tracking area update procedure if the preferred frequency is unavailable, a cell with a minimum threshold in the preferred frequency is unavailable, and the non-preferred frequency is unavailable.

33. A method that facilitates managing user equipment across one or more frequencies, comprising:
- receiving a network request, from a network node, to communicate a location for a user equipment;
- transmitting an attribute of a tracking area location that corresponds to the user equipment based upon the network request;
- receiving a determination that the attribute is at least one of a preferred frequency, a non-preferred frequency, or a forbidden frequency;
- implementing a camping instruction received from the network node to idle the user equipment on the tracking area location across one or more frequencies based at least in part upon the attribute; and
- switching from a frequency corresponding to a tracking area having the preferred frequency attribute to a frequency corresponding to a tracking area having the non-preferred frequency attribute when a quality condition drops below the threshold condition, wherein the threshold condition is a S-criteria threshold.

34. The method of claim 33, wherein the one or more frequencies correspond to one or more overlapping tracking areas, respectively.

35. The method of claim 34, wherein a first one of the one or more overlapping tracking areas has a preferred attribute and a second one of the overlapping tracking areas has a non-preferred attribute.

36. The method of claim 33, further comprising idling in a frequency corresponding to a tracking area having the preferred frequency attribute while a threshold condition remains satisfied.

37. The method of claim 33, further comprising utilizing at least one of a Non-access Stratum (NAS) protocol or an Evolved Packet Core (EPC) protocol to camp the user equipment based on the attribute to enhance accessibility to capability related to the user equipment and a subscription profile related to the user equipment.

38. The method of claim 33, further comprising providing uniform camping load balancing across disparate Radio Access Technologies (RATs), wherein control of the camping load balancing involves inter-RAT idle mode mobility.

39. The method of claim 33, further comprising enabling a vertical mobility associated with S-criteria and the attribute to supersede horizontal mobility associated with cell reselection parameters.

40. The method of claim 33, further comprising allocating the forbidden frequency to the user equipment to camp with a limited service state to reduce tracking area update procedure if the preferred frequency is unavailable, a cell with a minimum threshold in the preferred frequency is unavailable, and the non-preferred frequency is unavailable.

41. A wireless communications apparatus, comprising:
- at least one processor configured to:
  - receiving a network request, from a network node, to communicate a location for a user equipment;
  - transmitting an attribute of a tracking area location that corresponds to the user equipment based upon the network request;
  - receiving a determination that the attribute is at least one of a preferred frequency, a non-preferred frequency, or a forbidden frequency;
  - implementing a camping instruction received from the network node to idle the user equipment on the tracking area location across one or more frequencies based at least in part upon the attribute;
  - switching from a frequency corresponding a tracking area having the preferred frequency attribute to a frequency corresponding to a tracking area having the non-preferred frequency attribute when a quality condition drops below the threshold condition, wherein the threshold condition is a S-criteria threshold; and
- a memory coupled to the at least one processor.

42. The wireless communications apparatus of claim 41, wherein the one or more frequencies correspond to one or more overlapping tracking areas, respectively.

43. The wireless communications apparatus of claim 42, wherein a first one of the one or more overlapping tracking areas has a preferred attribute and a second one of the overlapping tracking areas has a non-preferred attribute.

44. The wireless communications apparatus of claim 41, wherein the at least one processor is further configured to idle in a frequency corresponding to a tracking area having the preferred frequency attribute while a threshold condition remains satisfied.

45. The wireless communications apparatus of claim 41, wherein the at least one processor is further configured to utilize at least one of a Non-access Stratum (NAS) protocol or an Evolved Packet Core (EPC) protocol to camp the user equipment based on the attribute to enhance accessibility to capability related to the user equipment and a subscription profile related to the user equipment.

46. The wireless communications apparatus of claim 41, wherein the at least one processor is further configured to provide uniform camping load balancing across disparate Radio Access Technologies (RATs), wherein control of the camping load balancing involves inter-RAT idle mode mobility.

47. The wireless communications apparatus of claim 41, wherein the at least one processor is further configured to enable a vertical mobility associated with S-criteria and the attribute to supersede horizontal mobility associated with cell reselection parameters.

48. The wireless communications apparatus of claim 41, wherein the at least one processor is further configured to allocate the forbidden frequency to the user equipment to camp with a limited service state to reduce tracking area update procedure if the preferred frequency is unavailable, a cell with a minimum threshold in the preferred frequency is unavailable, and the non-preferred frequency is unavailable.

49. A wireless communications apparatus that enables management of camping load balancing in a wireless communication environment, comprising:
- means for receiving a network request, from a network node, to communicate a location for a user equipment;
- means for transmitting an attribute of a tracking area location that corresponds to the user equipment based upon the network request;
- means for receiving a determination that the attribute is at least one of a preferred frequency, a non-preferred frequency, or a forbidden frequency;
- means for implementing a camping instruction received from the network node to idle the user equipment on the tracking area location across one or more frequencies based at least in part upon the attribute; and means for switching from a frequency corresponding to a tracking area having the preferred frequency attribute to a frequency corresponding to a tracking area having the non-preferred frequency attribute when a quality condition drops below the threshold condition, wherein the threshold condition is a S-criteria threshold.

50. The wireless communications apparatus of claim 49, wherein the one or more frequencies correspond to one or more overlapping tracking areas, respectively.

51. The wireless communications apparatus of claim 50, wherein a first one of the one or more overlapping tracking areas has a preferred attribute and a second one of the overlapping tracking areas has a non-preferred attribute.

52. The wireless communications apparatus of claim 49, further comprising means for idling in a frequency corresponding to a tracking area having the preferred frequency attribute while a threshold condition remains satisfied.

53. The wireless communications apparatus of claim 49, further comprising means for utilizing at least one of a Non-access Stratum (NAS) protocol or an Evolved Packet Core (EPC) protocol to camp the user equipment based on the attribute to enhance accessibility to capability related to the user equipment and a subscription profile related to the user equipment.

54. The wireless communications apparatus of claim 49, further comprising means for providing uniform camping load balancing across disparate Radio Access Technologies (RATs), wherein control of the camping load balancing involves inter-RAT idle mode mobility.

55. The wireless communications apparatus of claim 49, further comprising means for enabling a vertical mobility associated with S-criteria and the attribute to supersede horizontal mobility associated with cell reselection parameters.

56. The wireless communications apparatus of claim 49, further comprising means for allocating the forbidden frequency to the user equipment to camp with a limited service state to reduce tracking area update procedure if the preferred frequency is unavailable, a cell with a minimum threshold in the preferred frequency is unavailable, and the non-preferred frequency is unavailable.

57. A computer program product stored on a non-transitory computer readable medium and executable by a processor to cause at least one computer to:
receive a network request, from a network node, to communicate a location for a user equipment;
transmit an attribute of a tracking area location that corresponds to the user equipment based upon the network request;
receive a determination that the attribute is at least one of a preferred frequency, a non-preferred frequency, or a forbidden frequency; and
implement a camping instruction received from the network node to idle the user equipment on the tracking area location across one or more frequencies based at least in part upon the attribute; and
switch from a frequency corresponding to a tracking area having the preferred frequency attribute to a frequency corresponding to a tracking area having the non-preferred frequency attribute when a quality condition drops below the threshold condition, wherein the threshold condition is a S-criteria threshold.

58. The computer program product of claim 57, wherein the one or more frequencies correspond to one or more overlapping tracking areas, respectively.

59. The computer program product of claim 58, wherein a first one of the one or more overlapping tracking areas has a preferred attribute and a second one of the overlapping tracking areas has a non-preferred attribute.

60. The computer program product of claim 57, further executable by the processor to cause the at least one computer to idle in a frequency corresponding to a tracking area having the preferred frequency attribute while a threshold condition remains satisfied.

61. The computer program product of claim 57, further executable by the processor to cause the at least one computer to utilize at least one of a Non-access Stratum (NAS) protocol or an Evolved Packet Core (EPC) protocol to camp the user equipment based on the attribute to enhance accessibility to capability related to the user equipment and a subscription profile related to the user equipment.

62. The computer program product of claim 57, further executable by the processor to cause at least one computer to provide uniform camping load balancing across disparate Radio Access Technologies (RATs), wherein control of the camping load balancing involves inter-RAT idle mode mobility.

63. The computer program product of claim 57, further executable by the processor to cause the at least one computer to enable a vertical mobility associated with 5-criteria and the attribute to supersede horizontal mobility associated with cell reselection parameters.

64. The computer program product of claim 57, further executable by the processor to cause the at least one computer to allocate the forbidden frequency to the user equipment to camp with a limited service state to reduce tracking area update procedure if the preferred frequency is unavailable, a cell with a minimum threshold in the preferred frequency is unavailable, and the non-preferred frequency is unavailable.

* * * * *